May 27, 1969 D. W. HUSTED 3,446,549
DUAL FORMAT VIEWER

Filed Jan. 30, 1967 Sheet 1 of 3

INVENTOR
DAVID W. HUSTED

BY Beaman + Beaman
ATTORNEYS

INVENTOR
DAVID W. HUSTED

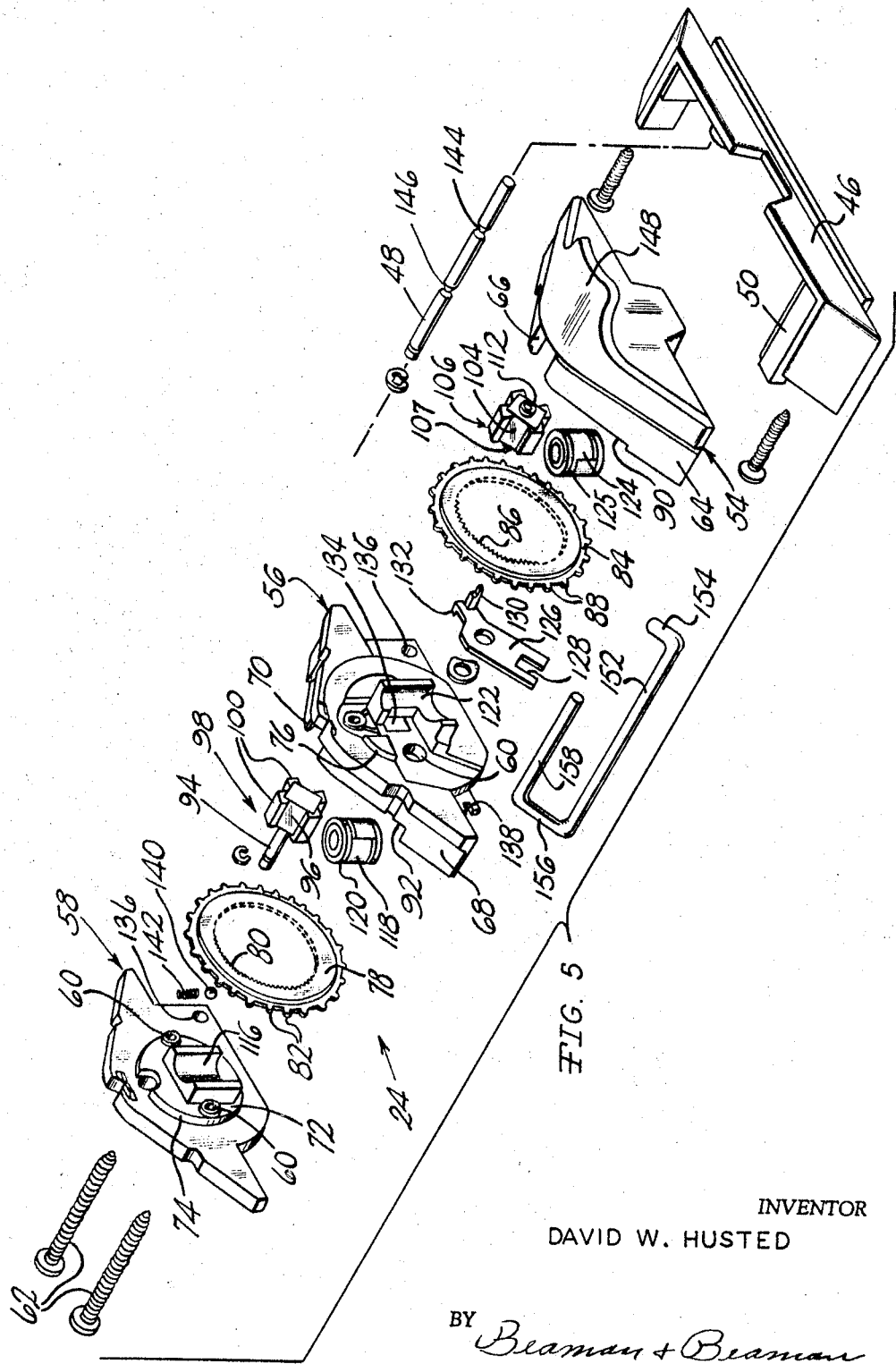

United States Patent Office 3,446,549
Patented May 27, 1969

3,446,549
DUAL FORMAT VIEWER
David W. Husted, Ann Arbor, Mich., assignor to Baia Corporation, Jackson, Mich., a corporation of Michigan
Filed Jan. 30, 1967, Ser. No. 612,710
Int. Cl. G03b 21/02, 21/12
U.S. Cl. 352—104     7 Claims

ABSTRACT OF THE DISCLOSURE

A viewer for motion picture film of the dual-format type wherein the viewer is capable of selectively accommodating different types or sizes of film, the selective accommodating means comprising a movably mounted carrier having first and second film tracks with associated apertures and shutters, the carrier being selectively positionable to place one of the film tracks and associated optical elements in alignment with the projection light beam.

Background of the invention

Motion picture film viewers, particularly those intended for home use, are of a relatively concise construction employing a projection screen of the back-lighted type which receives light from an optical system and projection lamp. The movie film is passed through a beam of light emitting from the projection lamp entering the optical system, and a film track shutter mechanism and focusing apparatus is employed in order to permit the movie film frame image to be projected upon the screen as it passes through the film track.

Most motion picture film intended for amateur or home use is of the 8 mm. type, and improved 8 mm. film has now become available and is commonly designated as Super 8 mm. film. The difference between Super 8 mm. film and the conventional 8 mm. film lies in changes in the frame size, relocation of the sprocket perforations with respect to the film edge, and changes in the size and spacing of the sprocket perforations. While the newer Super 8 mm. film provides superior projection characteristics, the physical differences between Super 8 mm. film and conventional 8 mm. film are such as to prevent interchangeability of the films with conventional film apparatus such as cameras, projectors and viewers. Owners of substantial quantities of conventional 8 mm. film are reluctant to purchase new cameras, projections and viewers which are solely usable with either conventional 8 mm. or Super 8 mm. film and, thus, the purchaser of photographic equipment is faced with a problem due to the incompatibility of existing apparatus to handle both types of film.

Summary of the invention

It is, therefore, an object of the invention to provide a motion picture film viewer which is able to accommodate movie film of different physical characteristics and, in particular, Super 8 mm. film and conventional 8 mm. film.

Another object of the invention is to provide a dual format motion picture film viewer wherein dual film tracks are mounted upon a common carrier and positioning of the carrier selectively renders one of the film tracks operable, while simultaneously removing the other film from an operative position.

A further object of the invention is to provide a dual format motion picture film viewer wherein a pair of film tracks, shutter devices and objective lens assemblies are mounted upon a common carrier, and wherein focusing means for the objective lenses simultaneously operates both lens assemblies.

Another object of the invention is to provide a dual format motion picture film viewer employing a carrier defining dual film tracks wherein the carrier may be readily adjusted in either of two operative positions, and wherein the shutter and objective lens apparatus required with each film track constitutes an assembly of the carrier and shifting of the carrier between its operative positions automatically positions all of the apparatus necessary for the projection of the film image within the projected beam of light.

Brief description of the drawings

FIG. 5 is an exploded, perspective view of the components of the carriage and carriage track.

Description of the preferred embodiment

Figure 1:
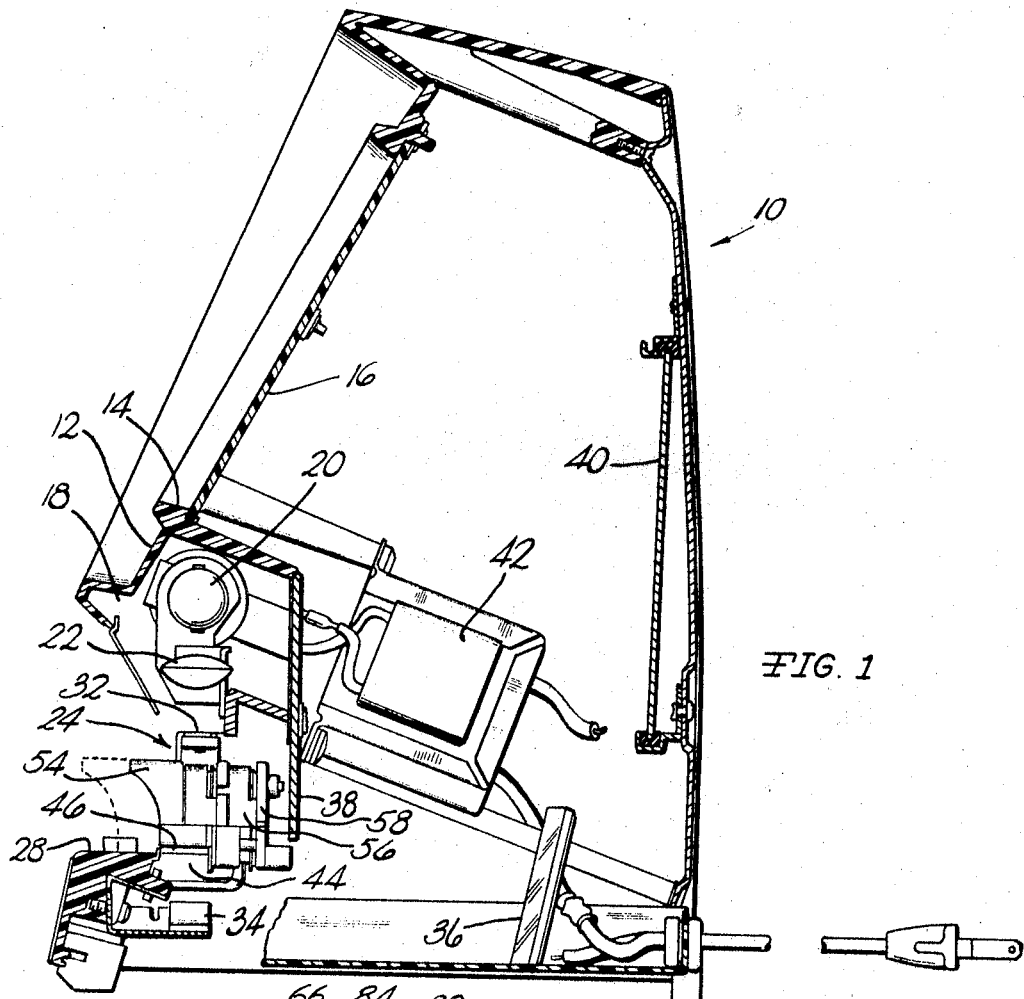
FIG. 1 is an elevational, side, sectional view of a home motion picture viewer in accord with the invention with the film guide removed for purposes of illustration.
Figure 2:
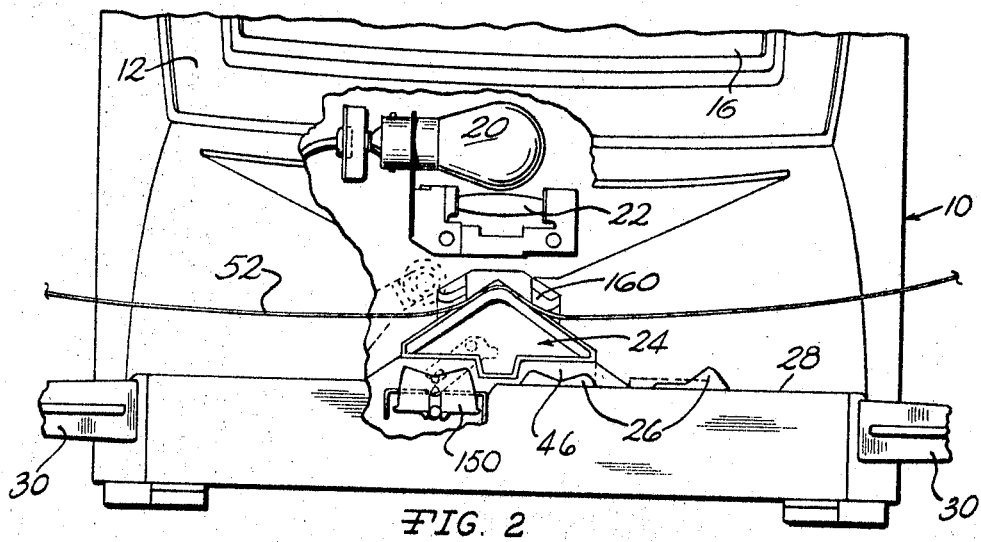
FIG. 2 is a detailed, front view, partially broken away and sectioned, of the viewer.

The motion picture film viewer in accord with the invention includes a housing or frame 10 which may be of a cast or sheet metal fabricated construction. In the illustrated embodiment, the frame is of a molded plastic, but it is within the scope of the invention that the frame could be formed of a cast metal. With reference to FIGS. 1 and 2, it will be noted that the frame includes a rear and side walls, as well as a bottom panel. The front wall 12 of the viewer has an opening 14 defined therein in which a translucent projection screen 16 is mounted. The lower front portion of the front wall of the housing is recessed at 18, FIG. 1, and within this recess the projection lamp 20 and associated condenser lens 22 structure, as well as the film track carriage or carrier 24, are located. A plurality of control elements in the form of switches and pivotal levers 26 are pivotally mounted upon the frame and project through openings defined in the frame horizontal surface 28, which is below and toward the viewer, with respect to the film track carrier 24. A pair of arms 30 which are partially shown in FIG. 2 are mounted upon the frame 10, an arm being located on each side of the viewer. The outer ends of the arms are provided with film, reel supports, and reel cranks, not shown, which may be of a conventional nature and are used to support the film and pull the film through the viewer film track. Preferably, the arms 30 are pivotally mounted to the frame whereby they may be swung along the lateral sides of the frame to a storage position when the viewer is not in use.

As previously mentioned, the projection lamp 20 is mounted in the upper portion of the recess 18 and a condenser lens mount and a condenser lens 22 are supported on the frame directly below the projection lamp, FIG. 2, for directing a condensed light beam through the heat filter 32, FIG. 1, and through a gate aperture defined on the film track carrier. After the condensed beam of light passes through the film, the light is reflected from a mirror 34, located below the carrier 24, to the mirror 36. The mirror 36 reflects the image to the mirror 38 which, in turn, reflects to the mirror 40 mounted on the rear wall of the viewer frame. From the mirror 40 the image is cast upon the rear side of the projection screen 16 wherein the projection screen is utilized in a back-lighted manner. It will be appreciated that the optical system consisting of the mirrors 34 through 40 enlarges the image and permits a relatively large image of the film frame to be projected upon the screen. A transformer 42 is located within the frame 10 for providing a reduced voltage to the projection lamp, and one of the switches 26 is electrically related to the projection light to control energization thereof.

A track for the film carrier is mounted adjacent the frame surface 28 at the lower portion of the recess 18. The frame 10 is provided with an opening 44 directly below the track support whereby light is free to pass from the film carrier to the mirror 34. The track support 46 may be formed of either metal or synthetic plastic, and its configuration will be appreciated from FIG. 5. A guide rod 48 is mounted in the track support and a linear track element 50 is mounted on the support in spaced, parallel relationship to the guide rod 48. The guide rod and the element 50 are disposed at right angles to the length of the film 52, FIG. 1, when disposed upon a carrier film track.

The dual film track carriage or carrier 24 includes a front portion 54, a center portion 56, and a rear portion 58. The portions 54, 56, and 58, preferably, are molded of a synthetic plastic material and are provided with aligned holes 60 and suitable engaging and abutting surfaces whereby assembly of the portions may be maintained by screws 62. The front carrier portion 54 is provided with a convex film track 64 which at its apex is open to form the gate aperture 66. A film track 68 of similar construction is defined upon the carrier center portion 56, which includes the gate aperture 70.

The rear carrier portion 58 is provided with a cylindrical projection 72 defining a circular surface 74 which constitutes a bearing surface for a ring gear, as will be later described. The center carrier portion 56 is provided with a similar cylindrical projection and surface 76 which also functions as a bearing for a ring gear.

The rear ring gear 78 includes an inner bore in which are formed a plurality of gear teeth 80. The outer periphery of the ring gear 78 is provided with a plurality of film perforation or notch-engaging teeth 82. As will be apparent from FIG. 3, the ring gear cross section is offset whereby the teeth 80 and the teeth 82 are not in axial alignment, but are axially displaced with respect to each other. The innermost portions or apexes of the teeth 80 are adapted to slidably engage the cylindrical surface 74, and in this manner the ring gear is rotatably mounted upon the projection 72.

The ring gear 84 includes inwardly disposed gear teeth 86 having apexes which engage with the center carriage portion surface 76 to rotatably mount the ring gear 84 thereon. The outer periphery of the ring gear 84 is formed with teeth 88 adapted to engage the film perforations associated with the film track 64. As will be apparent from FIG. 3, the cross-sectional configuration of the ring gear 84 is such that the teeth 86 and the teeth 88 are axially displaced with respect to each other, and the ring gear configuration is such that the teeth 88 may be closely disposed to an edge of the film track 64, as will be later described.

In the illustrated embodiment, the spacing of the teeth 88 is such that these perforations cooperate with the notches formed in Super 8 mm. film. The front carrier portion 54 is recessed at 90 whereby the upper portion of the gear teeth 88 may extend through the recess, positioning the teeth within the film track 64. Likewise, the center carrier portion 56 is recessed at 92 to permit the gear teeth 82 to be located within the film track 68.

Figure 3:
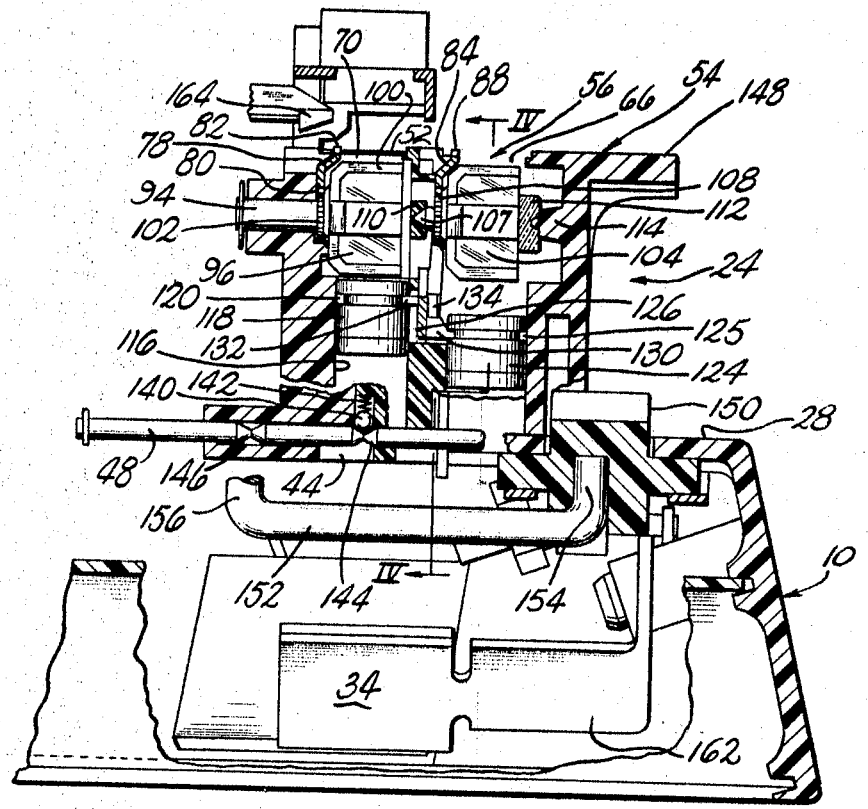
FIG. 3 is an enlarged, detail, elevational, sectional view of the film track carriage and associated structure including broken away sections.

The rear carriage portion 58 is provided with a bore in which the shaft 94 of a rotatable shutter is mounted for rotation. The shutter consists of a rectangular prism 96 of molded glass or clear acrylic material mounted within a retainer 98 having four fingers 100 which extend in the axial direction and engage the corners of the prism. The fingers 100 are of sufficient width, as related to the aperture 70, to prevent light from passing through the prism when a finger is in alignment with the aperture. A gear 102, FIG. 3, is mounted upon the shutter shaft 94 and meshes with the ring gear teeth 80. A snap ring maintains the shutter within the bore, and it will be appreciated that the aforedescribed structure permits rotation of the shutter prism 96 upon rotation of the ring gear 78. The size of the shutter gear 102 and the relationship of the teeth thereof with the ring gear teeth 80 is such that the square prism 96 rotates 90° upon the ring gear 78 rotating through an arc corresponding to the spacing between adjacent film notch-engaging teeth 82.

A second shutter assembly is mounted between the central carrier portion 56 and the front portion 54, adapted to be driven by the ring gear 84. The shutter includes a square clear prism 104 mounted within a four-pronged retainer 106 similar to that of retainer 98. The retainer 106 includes a shaft and shaft point 107 upon which the pinion gear 108 is mounted. The point 107 is rotatably supported by bearing 110 defined on portion 56 and the pinion gear 108 meshes with the teeth 86 of the ring gear 84. The prism 104 is provided with an extension 112 coaxial with the point 107 and is recessed for cooperation with a projection 114 defined upon the front carrier portion 54. Thus, the shutter prism 104 is rotatably supported between the carriage portions 54 and 56 and will rotate about its axis upon being driven by the ring gear 84. The diameter of the gear 108 and the number of teeth thereof is such that the shutter prism will rotate 90° upon angular rotation of the ring gear 84 equivalent to the spacing between adjacent film perforation engaging teeth 88.

The rear carrier portion 58 is formed with a cylindrical concave guideway 116 adapted to slidably receive the objective lens assembly 118 which is of a cylindrical configuration and is provided with an annular peripheral notch 120, as will be appreciated from FIG. 3. The lens assembly 118 is located between the central portion 56 and rear portion 58 and will also engage a guideway similar to 116 defined in the center carrier portion. The lens assembly, therefore, is slidably positioned within its guides for movement toward and away from the shutter prism 96. It will be noted that the aperture 70, the shutter prism 96, and the lens assembly 118 are in an aligned relationship, FIG. 3.

The center carriage portion 56 is formed with a concave cylindrical guideway 122 adapted to receive the objective lens assembly 124. The lens assembly 124 is formed with an annular notch 125 and is maintained in the guideway 122 by cooperation and opposed engagement with a similar concave guideway defined in the front carrier portion 54. The lens assembly 122, therefore, is also adjustable in a linear direction toward the shutter prism 104, and the aperture 66, shutter prism 104, and lens assembly 122 are mounted upon the carrier in a linear, aligned relationship, FIG. 3.

Adjustment of the objective lens assemblies 118 and 124 is accomplished through a lever 126 pivotally mounted upon one of the screws 62. The lever 126 includes a portion having a notch 128 defined therein. On the opposite side of the pivot hole a pair of projections 130 and 132 extend therefrom. The projection 130 extends through an opening 134 defined in the center carrier portion 56 for cooperation with the notch 125 defined in the lens assembly 124. The projection 132 extends into the notch 120 of the lens assembly 118. These relationships will be apparent from FIG. 3.

The ring gears 78 and 84 are maintained upon their respective surfaces 74 and 76 by surfaces defined on carrier portions 56 and 54, respectively. Upon the portions 54, 56 and 58 being assembled as a unit by screws 62, the portions intermesh as described above to form a concise configuration which is readily movable as an assembly.

Figure 4:
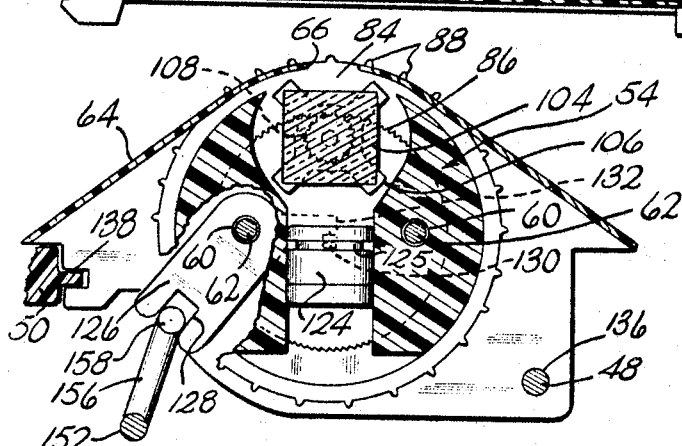
FIG. 4 is an elevational, enlarged, detail, sectional view through the cariage, taken along section IV—IV of FIG. 3, and partially broken away.

The carrier 24 is movably mounted upon the track support 46 by means of holes 136 defined in the rear and center carrier portions which slidably receive the guide rod 48. Additionally, the center carrier portion 56 is formed with a notch 138 which receives the track element 50, FIG. 4. In this manner the entire carrier 24 may be shifted along the guide rod and element 50. To position the carrier 24 upon the track support 46, a ball detent 140 biased by a spring 142 is mounted in a recess defined in the center carrier portion 56, FIG. 3, which communicates with the associated guide rod receiving hole 136. Notches 144 and 146 are defined upon the guide rod 48 for cooperation with the detent ball 140. The front carrier portion 54 includes a handle portion 148 which permits gripping by the operator. The operator, therefore, is able to grip the portion 148 and slide the carrier 24 in a direction which is at right angles to the film 52 which will be mounted upon one of the film tracks of the carrier.

Operation of the focusing lever 126 is accomplished through a lever actuator which is best illustrated in FIGS. 2 and 3. A pivotally supported handle member 150 extends through an opening in the frame surface 28 and is pivotally mounted thereon whereby the handle may be rocked about its pivot axis in either a clockwise or counterclockwise direction, depending upon where the operator places his finger to depress the handle. A crank member 152 which may be formed of a wire rod includes one end 154 which is received within the handle 150, FIG. 3, and the focusing crank extends toward the frame and is bent upwardly at 156 and forwardly at 158. The portion 158 is parallel to the rod 48 and element 50 and is received within the focusing lever notch 128, and is of sufficient length to maintain engagement with the notch 128 during the entire movement of the carrier 24 upon the track support 46. Thus, the single handle 150 may be used to focus and operate the objective lens assemblies 118 and 124, regardless of which film track and lens assembly is being employed.

To operate the motion picture film viewer, the operator grasps the carrier handle portion 148 and slides the carrier 24 upon its track support 46 to position the carrier in the operative position for the particular film to be used. For instance, if Super 8 mm. film is to be viewed, the carrier 24 is moved its maximum distance into the recess 18, away from the operator, to the full line position shown in FIG. 1. In this position detent 140 engages groove 146, the aperture 66 will be disposed within the light beam formed by the condensing lens 22, and the beam of light entering the aperture passes through the shutter prism 104 and objective lens 124 to the mirror 24. If conventional 8 mm. film is to be viewed, the carrier 24 is pulled outwardly from the recess 18 to the dotted line position of FIG. 1, which is the relationship shown in FIG. 3, wherein the detent 140 engages groove 144 and the aperture 70 is adapted to receive the beam of light from the condensing lens 22 and projection lamp.

Assuming conventional 8 mm. film is to be viewed, the components will be in that relationship shown in FIG. 3. The film 52 is fed from a reel mounted upon the left arm 30 onto the film track 68. The film passes from the film track 68 to a film reel mounted upon the right arm 30. As will be apparent from FIG. 2, film guide 160 is disposed above the carrier 24 and is of an inverted V-configuration to insure that the film will be maintained on the upper portion of the film track during viewing. Particularly, the guide 160 insures that the film perforations will be in engagement with the outer teeth of the appropriate ring gear.

Normally, the movement of the film will be toward the right, as the reel mounted upon the right arm 30 is rotated. As the film 52 moves to the right, the engagement of the film perforations with the teeth 82 will rotate the ring gear 78 and, thus, rotate the shutter prism 96. Lateral movement of the film in the film track 68 is prevented due to engagement of the edges of the film with guiding edges defined upon the center carrier portion 56 and the rear carrier portion 58. Similarly, guiding edges are defined on the front carrier portion 54 and center portion 56 adjacent track 64 to maintain a Super 8 mm. film within the proper location in the film track 64.

As the film is pulled across the film track 68, the beam of light passing through the condensing lens 22 and heat filter 32 will pass through the frames of the film as they pass over the aperture 70. As the light is alternately shuttered and passed through the rotating prism 96, a rectified image is projected upon the screen 16 via the mirrors of the optical system. Focusing of the image is accomplished by operating the focusing handle 150 to pivot the crank 152 which will pivot the lever 126 and raise and lower the objective lens assembly 118. While adjustment of the lens assembly 118 also adjusts the lens assembly 124, the adjustment of the lens assembly 124 does not adversely affect the operation.

If Super 8 mm. film is to be viewed, the carrier 24 is positioned to the full line position of FIG. 1 wherein the ball detent 140 engages the guide rod groove 146. The film 52 is then placed within the film track 64 and the ring gear teeth 88 will engage the film notches to rotate the shutter prism 104 when the film is pulled across the aperture 66. The physical difference of the spacing between the notches of Super 8 mm. film and the left edge of the film will be appreciated from FIG. 3. The notches of the Super 8 mm. film are considerably closer to the adjacent film edge, as compared to conventional 8 mm. film, and, thus, the configuration of the ring gear 84 is such as to position the teeth 88 very close to the innermost film-engaging shoulder of track 64.

A plurality of pivotal levers 26 are mounted in the frame extending through openings defined in the frame surface 28, as previously mentioned. One of these levers is connected to the bracket 162 supporting the mirror 34 for "centering" the image upon the projection screen 16. Also, one of the levers 26 is connected to a notching lever which includes a sharpened end point 164 for selectively notching the film adjacent the aperture through which light is passing to indicate where splicing should occur.

It will be appreciated that the invention provides a dual format motion picture film viewer which is able to be very quickly and simply adjusted to accommodate different types of film, and by incorporating separate film tracks, apertures, shutter prisms and objective lenses in a common carrier, a dependable, yet relatively simplified and concise construction is possible which eliminates time-consuming replacement and conversion operations. As the focusing crank portion 158 always remains in engagement with the focusing lever notch 128, a single focusing control handle permits focusing regardless of which film size is being viewed and, thus, simplifies the operation of the device.

It is appreciated that various modifications to the inventive concept may be apparent to those skilled in the art without departing from the spirit and scope thereof, and it is intended that the invention be defined only by the following claims.

I claim:
1. A dual format motion picture film viewer comprising, in combination, a frame, a projection screen mounted upon said frame, a projection lamp mounted upon said frame, an optic system mounted on said frame adapted to receive a light beam from said lamp and project said beam upon said screen, a film track carrier movably mounted on said frame for movement between first and second positions relative to said light beam, first and second film tracks defined on said carrier, an aperture defined in each of said film tracks, first and second shutters mounted on said carrier and movably mounted relative to said carrier, said first shutter adapted to receive light from the aperture of said first film track and said second shutter adapted to receive light from the aperture of said second film track, first shutter drive means mounted on said carrier in driving connection with said first shutter and adapted to operatively engage film within said first film track, second shutter drive means mounted on said carrier in driving connection with said second shutter and adapted to operatively engage film within said second film track, said first position of said carrier positioning said first film track aperture and first shutter within said light beam, and said second position of said carrier positioning said second film track aperture and second shutter within said light beam.

2. In a dual format motion picture film viewer as in claim 1 wherein said shutters are rotatably mounted upon said carrier.

3. In a dual format motion picture film viewer as in claim 2 wherein a track is defined on said frame, said carrier being slidably mounted on said track for movement between said first and second positions.

4. In a dual format motion picture film viewer as in claim 2 wherein first and second objective lenses are movably mounted on said carrier, said first lens being disposed adjacent said first shutter and said second lens being disposed adjacent said second shutter, and means mounted on said carrier cooperating with said lenses for adjusting said lenses with respect to the associated shutter.

5. In a dual format motion picture film viewer as in claim 4 wherein common means are employed for adjusting said objective lenses.

6. In a dual format motion picture film viewer as in claim 5 wherein said means for adjusting said lenses comprises a lever pivotally mounted on said carrier, said lever including a pair of projections, each of said projections cooperating with a different objective lens whereby pivotal movement of said lever simultaneously adjusts both of said lenses, and lever operating means mounted upon said frame.

7. In a dual format motion picture film viewer as in claim 4 wherein said track defined on said frame is linear in configuration, said carrier being slidably mounted on said frame for linear movement between said first and second positions, said means adjusting said objective lenses comprising a pivotally mounted lever having an opening defined therein spaced from the lever pivot, a lever actuator mounted on said frame, said actuator including a linear operating member extending parallel to said track, said operating member being received within said lever opening whereby said operating member remains within said opening during movement of said carrier between said first and second positions.

References Cited

UNITED STATES PATENTS

| | | | |
|---|---|---|---|
| 2,168,941 | 8/1939 | Marks | 352—80 |
| 2,576,586 | 11/1951 | Frankel | 352—119 |
| 3,159,077 | 12/1964 | Hoag et al. | |

JULIA E. CORNER, *Primary Examiner.*

U.S. Cl. X.R.

352—129, 79, 119